(12) United States Patent
Sæther et al.

(10) Patent No.: US 11,662,498 B2
(45) Date of Patent: May 30, 2023

(54) METHOD OF CALCULATING TEMPERATURE OF A GEOLOGICAL STRUCTURE

(71) Applicant: EQUINOR ENERGY AS, Stavanger (NO)

(72) Inventors: Bjørn Magnus Sæther, Ranheim (NO); Zuzana Alasonati Tasarova, Ranheim (NO); Ketil Hokstad, Trondheim (NO); Kati Tänavsuu-Milkeviciene, Ranheim (NO)

(73) Assignee: EQUINOR ENERGY AS, Stavanger (NO)

( * ) Notice: Subject to any disclaimer, the term of this patent is extended or adjusted under 35 U.S.C. 154(b) by 130 days.

(21) Appl. No.: 17/261,721

(22) PCT Filed: Jul. 24, 2019

(86) PCT No.: PCT/NO2019/050157
§ 371 (c)(1),
(2) Date: Jan. 20, 2021

(87) PCT Pub. No.: WO2020/022908
PCT Pub. Date: Jan. 30, 2020

(65) Prior Publication Data
US 2021/0255352 A1  Aug. 19, 2021

(30) Foreign Application Priority Data
Jul. 26, 2018 (GB) ..................................... 1812189

(51) Int. Cl.
*G01V 3/30* (2006.01)
*E21B 47/13* (2012.01)
(Continued)

(52) U.S. Cl.
CPC ................ *G01V 3/30* (2013.01); *E21B 47/07* (2020.05); *E21B 47/13* (2020.05); *G01V 3/34* (2013.01); *G01V 3/38* (2013.01); *G01V 3/40* (2013.01)

(58) Field of Classification Search
None
See application file for complete search history.

(56) References Cited

U.S. PATENT DOCUMENTS

2012/0239341 A1    9/2012 Liu et al.
2014/0365193 A1   12/2014 Biegert et al.

FOREIGN PATENT DOCUMENTS

CN    106419857 A    2/2017
CN    106556466 A    4/2017
(Continued)

OTHER PUBLICATIONS

Ibrahim Aydin, Erdinc Oksum, Exponential approach to estimate the Curie-temperature depth, Journal of Geophysics and Engineering, vol. 7, Issue 2, Jun. 2010, pp. 113-125, https://doi.org/10.1088/1742-2132/7/2/001 (Year: 2010).*

(Continued)

*Primary Examiner* — Lina M Cordero
(74) *Attorney, Agent, or Firm* — Eversheds Sutherland (US) LLP

(57) ABSTRACT

A method of calculating the temperature of a geological structure is disclosed, wherein there is provided a magnetic parameter of the geological structure. The method includes inverting the magnetic parameter to estimate the temperature of the geological structure.

21 Claims, 2 Drawing Sheets

(51) Int. Cl.
  *E21B 47/07* (2012.01)
  *G01V 3/34* (2006.01)
  *G01V 3/38* (2006.01)
  *G01V 3/40* (2006.01)

(56) References Cited

FOREIGN PATENT DOCUMENTS

| | | | |
|---|---|---|---|
| GB | 2563048 | A | 12/2018 |
| JP | 2013517515 | A | 5/2013 |
| JP | 2016085114 | A | 5/2016 |
| WO | 2017142422 | A1 | 8/2017 |

OTHER PUBLICATIONS

Search Report for EP19840227.3, dated Mar. 7, 2022 (14 pp.).
Salem, Ahmed, et al., Depth to Curie Temperature Across te Central Red Sea from Magnetic Data Using the De-fractal Method, Tectonophysics, 2013 (12 pp.).
Afshar, A., et al., Curie Point Depth, Geothermal Gradient and Heat-Flow Estimation and Geothermal Anomaly Exploration from Integrated Analysis of Aeromagnetic and Gravity Data on the Sabalan Area, NW Iran, Pure and Applied Geophyisics, 2017 (20 pp.).
Okubo, Y., et al., Curie point depths of the Island of Kyushu and surrounding areas, Japan, Geophysics, Vo. 53, No. 3, Mar. 1985 (14 pp.).
Ebbing, Jorg, et al., A discussion of structural and thermal control of magnetic anomalies on the mid-Norwegian margin, Geophysical Prospecting, 2009, 57, 665-681 (17 pp.).
International Search Report and Written Opinion, PCT/NO2019/050157, dated Sep. 20, 2019 (7 pp.).
Search Report, GB1812189.7, dated Jan. 16, 2019 (5 pp.).
Avdan, Ugur et al., Algorithm for Automated Mapping of Land Surface Temperature Using LANDSAT 8 Satellite Data, Hindawi Publishing Corporation, Journal of Sensors, vol. 2016, Article ID 148307, http://dx.doi.org/10.1155/2016/1480307, 2016 (8 pp.).
Hokstad, Ketil et al., Temperature Prediction by Multigeophysical Inversion: Application to the IDDP-2 Well at Reykjanes, Iceland, GRC Transactions, vol. 41, 2017 (12 pp.).
Lattard, Dominique et al., Curie temperatures of synthetic titanomagnetites in the Fe—Ti—O system: Effects of composition, crystal chemistry, and thermomagnetic methods, Journal of Geophysical Research, vol. 111, B12S28, doi:10.1029/2006JB004592, 2006 (18 pp.).
Li, Yaoguo et al., 3-D inversion of magnetic data, Geophysics, vol. 61, No. 2 (Mar.-Apr. 1996), p. 394-408, 18 Figs. (15 pp.).
Office Action , JP2021-503772 (in Japanese) (4 pp.).

\* cited by examiner

METHOD OF CALCULATING TEMPERATURE OF A GEOLOGICAL STRUCTURE

TECHNICAL FIELD

The present invention provides a method of calculating the temperature of a geological structure, methods of prospecting for geothermal energy and/or petroleum, a method of seabed mining, and methods of harnessing geothermal energy and/or drilling for petroleum.

BACKGROUND OF THE INVENTION

Predictions or knowledge of temperatures within the Earth are of major importance for the geothermal energy and petrochemical industries. Seabed mining and the drilling of wells for harnessing geothermal energy or obtaining petroleum are expensive and time consuming activities, and it is therefore important to estimate prior to mining or drilling where the best location for mining or drilling is, what the best direction to mine or drill is, and what depth to mine or drill to. Knowledge of temperatures can be of use when deciding where to mine or drill wells.

Dependencies between physical quantities can conveniently be represented by Bayesian networks. FIG. 1 shows the general multi-geophysical Bayesian network for estimation of the subsurface temperature T from geophysical parameters $\{\sigma, M, \rho, v_p, v_s\}$. As shown in FIG. 1, the geophysical parameters $\{\sigma, M, \rho, v_p, v_s\}$ in turn depend on geophysical data (like magnetotelluric data (MT), magnetic data (mag), gravity data (grav), and seismic data (Seismic)), which can be included in an extended Bayesian network. In this figure, $\sigma$ is resistivity (or conductivity), M is total magnetization (including both induced and remnant magnetization), $\rho$ is density, $v_p$ is p-wave velocity, and $v_s$ is s-wave velocity.

However, previous work has only used resistivity from MT data and density from gravity data to compute subsurface temperature. Magnetic data has not previously been used to compute subsurface temperature.

There is therefore a need for an improved method for estimating temperature in a geological structure.

SUMMARY OF THE INVENTION

In one aspect, the invention provides a method of calculating the temperature of a geological structure, wherein there is provided a magnetic parameter of the geological structure, the method comprising: inverting the magnetic parameter to estimate the temperature of the geological structure.

The inventors have found that the temperature of a geological structure can be found by inverting a magnetic parameter of the geological structure. This method is advantageous as magnetic parameters have not been used before to estimate the temperature of a geological structure and their use can improve the temperature estimate.

The magnetization of minerals and rocks can be seen as a battle between quantum-mechanical order and thermal disorder. The transition between these two domains takes place around the Curie/Neel temperature: below the Curie temperature the rock is ferromagnetic or ferrimagnetic; above the Curie temperature, only a weak paramagnetism or diamagnetism remains. For this reason, it may be expected that magnetic data and magnetization may be useful sources of information about the presence of working geothermal systems in geological structures.

Inverting or inversion is a well-known term in the art. It describes the process of calculating, from at least one observed/measured parameter, the cause of the parameter (or at least one of the causes of the parameter). Thus, in the present case, physically speaking, the temperature affects the magnetic parameter(s) of the geological structure. However, it is the magnetic data that is(are) measured and not the temperature. Calculating the temperature from the magnetic parameter(s) may therefore be described as inverting.

The inversion may be considered to be a calculation that uses a model (such as phenomenological or rock physics model), such as discussed below. The model may relate the magnetic parameter(s) to the temperature to calculate the temperature value from the magnetic parameter(s).

Preferably, the temperature of the geological structure is estimated from only the magnetic parameter or from only the magnetic parameter and one or more further magnetic parameters. Thus, only one or more magnetic parameters may be required or used to estimate the temperature of the geological structure. In a preferred embodiment, the temperature of the geological structure is estimated from (only) a single magnetic parameter.

In the present method, the magnetic parameter may be a magnetization of the geological structure, for example. The magnetization could be, and preferably is, the total magnetization of the geological structure, e.g. including both the remnant and induced magnetizations. Alternatively, just one of these magnetizations, e.g. the induced magnetization, could be used as the magnetic parameter.

The method preferably also comprises inverting and/or modelling to convert measured (magnetic data) to determine the magnetic parameter (e.g. magnetization).

The measured data is preferably magnetic data, e.g. magnetic anomaly data, such as magnetic potential field data. The measured data could (alternatively) be, for example, magnetotelluric and/or controlled source EM data.

The magnetic parameter, determined in that way, may then be inverted in order to determine the temperature of the geological structure.

The magnetic parameter is preferably the total magnetization of the geological structure, e.g. comprising both the induced magnetization and the remnant magnetization.

The inversion of measured data to determine the at least one magnetic parameter may be performed using a map inversion method, e.g. a Marquardt-Levenberg type map inversion method, or any other (e.g. 3D) inversion method serving the same purpose, such as the methods presented by Li and Oldenburg (1996) or Hokstad et al. (2017). The inversion of measured data may determine laterally varying (total) magnetization averaged, for example, over a (relevant) depth interval.

The inversion of the at least one magnetic parameter to determine the temperature is preferably performed using a Bayesian inversion method and a phenomenological model.

The phenomenological model may use or be based on a (titanomagnetite) spinodal exsolution model and/or the (1D) Ising model from quantum statistics, for example. Such a model may be particularly suited to relatively young volcanic rocks in geologically active areas.

Alternatively, e.g. for very old igneous rocks, such as continental crust and cratons, a phenomenological model based on a bi-nodal exsolution model, such as JMAK kinetics, could be used. Other models may alternatively be used. However, preferably the model should be a kinetic model, e.g. with an activation energy (i.e. a energy barrier).

The phenomenological model may comprise one or more parameters, such as the initial titanium fraction of the lavas at the time of deposition and/or the total percentage of magnetic material in the subsurface. The one or more parameters may be calibrated, e.g. by combining the one or more parameters to form empirical factors that may be calibrated for, e.g. for each geological structure.

As a by-product of the second stage inversion, estimates of the Curie temperatures, mineral composition, and/or fractions of different titanomagnetite phases may (also) be obtained.

The method may comprise selecting a phenomenological model(s) that defines the relationship between the magnetic parameter(s) and the temperature of the geological structure, e.g. for use in the inversion of the magnetic parameter to determine the temperature of the geological structure.

The phenomenological model may be a relationship between the magnetic parameter (e.g. magnetization) and the temperature of the geological structure.

The phenomenological model may be selected based upon expected trends relating the magnetic parameter to temperature. For instance, the magnetic parameter may generally increase or decrease (depending on the magnetic parameter) with increasing temperature. In the case of magnetization being the magnetic parameter, magnetization may decrease with increasing temperature.

When the magnetic parameter decreases with increasing temperature, the model may be a decaying function, e.g. a decaying exponential function such as the Arrhenius equation (which may be used to describe the electric conductivity and/or resistivity of dry basalt, for example). When the magnetic parameter increases with increasing temperature, the model may be a sigmoid function (e.g. for induced magnetisation or susceptibility below the Curie temperature) or exponential function or linear function.

Thus, as can be understood from the above, the precise phenomenological model can be selected by the skilled person based upon knowledge of rock physics relations.

Preferably, the respective model relationships between temperature and the magnetic parameter are not dependent on any other variable, such as any other geophysical parameters. Of course, other constant factors may be present, but there is preferably only one variable. The constant factors may be found by calibration with data.

It should be understood that the phenomenological model may not show the full complexity of the system, i.e. the model may be intentionally simplified such that the magnetic parameter is dependent only on the temperature. In reality, geophysical/magnetic parameters generally depend on many variables. However, in the model(s) used in the present method, the magnetic parameter may only depend on the variable of interest, which in this case is temperature.

There may be provided calibration data e.g. comprising at least one measurement of the magnetic parameter and the temperature of the geological structure. This data may be taken, for example, from a (rock) sample of the geological structure. The method may further comprise obtaining the calibration data. The calibration data may preferably contain a plurality of measurements of the magnetic parameter and the temperature of the geological structure. In an example, well log data is used to calibrate and/or constrain the phenomenological model.

The method may comprise optimising the phenomenological model based on the calibration data. This optimisation may comprise using the calibration data to find the optimal values of the/any constant factors in the phenomenological model. Typically, the greater the amount of calibration data, the better the optimisation will be.

In order to optimise the phenomenological model, it may be assumed that the phenomenological model, has a certain error distribution (i.e. the difference between the at least one magnetic parameter and the temperature gives an error distribution). Preferably, the error distribution is assumed to be a Gaussian error distribution, preferably with zero mean. The phenomenological model may be optimised by reducing the error distribution so that it is as small as possible, such as by having a mean of the error distribution to be as close as possible to zero and by having a small a variance of the error distribution as possible. The optimisation may be achieved by finding the value(s) of the constant factor(s) in the phenomenological model that optimise(s) the phenomenological model.

The optimised phenomenological model may then be used in the inversion to produce a more accurate inversion.

The phenomenological model may be used in the inversion to calculate the probability distribution (and/or the mean and/or variance values (directly)) of the at least one magnetic parameter, given a particular value of the temperature. This probability distribution function may be used to calculate the probability distribution of temperature (and/or the mean and/or variance values (directly)), given particular values of the magnetic parameter.

By "phenomenological model" here, it may simply mean the mathematical relationships used in the inversion, such as the phenomenological model relating the magnetic parameter to the temperature.

Performing the inversion in the Bayesian setting, as discussed above, can allow for an (accurate) estimate of the uncertainty in the calculated temperature value to be found. Thus, the method may comprise finding the uncertainty in the calculated temperature.

The magnetic data (e.g. magnetic potential field data may be gathered using known techniques, such as with a magnetometer, e.g. a GEM Systems GSM-19T Proton magnetometer. A magnetometer may be carried by satellite, ship, or drone, for example. A magnetometer may be handheld. The method may comprise gathering/obtaining the magnetic data, e.g. with a magnetometer.

The magnetic data may have been acquired prior to any drilling, in which case the magnetic data may be considered to be pre-drilling magnetic data. This data may be used to provide a pre-drilling estimate of the temperature (e.g. by performing the method of the present invention). Additionally or alternatively, the magnetic data may have been gathered during or after the drilling of a well. This may be used to provide a during-drilling or post-drilling estimate of the temperature (e.g. by performing the method of the present invention), which may be considered to be an update to the existing estimates.

The method may comprise acquiring the magnetic data prior to drilling. Additionally or alternatively, the method may comprise acquiring the magnetic data during drilling (such as through one or more well logs in the partially-drilled well). Additionally or alternatively, the method may comprise acquiring the magnetic data after the drilling of the well (such as through one or more well logs in the well). The data acquired during or after the drilling may be or comprise temperature data (i.e. a direct measurement of the temperature), which could be used to update previous temperature estimates (e.g. the pre-drilling estimate, or a previous during-drilling estimate) by offering a further constraint to the inversion problem.

The method may comprise calculating the temperature prior to a drilling or mining operation.

Additionally or alternatively, the method may comprise calculating the temperature during a drilling or mining operation. This may be considered to be an update to the pre-drilling or pre-mining temperature calculation.

Additionally or alternatively, the method may comprise calculating the temperature after the well has been drilled. This may be considered to be an update to the pre-drilling and/or during-drilling temperature calculation.

It should be appreciated that the above methods may calculate the temperature for a specific point/location/volume/space of the geological structure, said point/location/volume/space corresponding to the point/location/volume/space of the magnetic parameter used in the inversion step (the magnetic parameter(s) used in these methods may be the value of that parameter at a given point/location/volume/space in the geological structure). Therefore, in order to obtain the spatially dependent temperature function, the above inversion method may be performed point-wise for multiple different points/locations/volumes/spaces in the geological structure. As can be appreciated, the magnetic parameter(s) may vary over the space of the geological structure, and this may correspond to a spatially varying temperature.

Thus, the method may comprise constructing a spatially dependent temperature function. This function may be constructed by calculating the temperature for different points/locations/volumes/spaces in the geological structure (preferably all points/locations/volumes/spaces in the geological structure). The temperature may be calculated over substantially the entirety of the geological structure, or over a particular area and/or depth.

The temperature may be found in one, two or three dimensions.

The temperature may be found as function of depth, and possibly also horizontal location. This may provide the user with an estimate of the depth, and possibly also the horizontal location, of possible targets for drilling or mining. Such a target may be a supercritical water reservoir, for example.

In a second aspect, the invention provides a method of producing a temperature model of a geological structure comprising performing any of the methods of the first aspect.

As can be appreciated, the above methods may be used when prospecting for geothermal energy, petroleum, and/or minerals (e.g., metal sulfides), e.g. when planning and performing geothermal/petroleum well drilling or mineral mining operations.

In a third aspect, the invention provides a method of prospecting for geothermal energy, petroleum, and/or minerals comprising performing any of the methods of any of the first or second aspects and using the calculated temperature in the decision-making process for the drilling of a well or for the mining of a mine.

The calculated temperature may be used prior to drilling or mining, e.g. when deciding where to drill the well and/or how deep to drill the well, or where/how deep to mine the mine. The temperature calculation may provide the user of the method with a temperature (e.g. temperature vs. depth) estimate, which can be used to decide where, how deep and/or in which direction to drill or mine.

Additionally or alternatively, the calculated temperature may be used during or after the drilling of the well or mining of the mine, e.g. when deciding in which direction or to which depth to continue drilling or mining. This may particularly be the case where geophysical data is gathered during or after the drilling of the well or mining of a mine, as discussed below.

The method may comprise performing a calculation of the temperature prior to drilling or mining. This may be referred to as a pre-drilling or pre-mining calculation. The pre-drilling or pre-mining calculation may be used to decide where to begin drilling or mining.

The method may comprise drilling the geothermal/petroleum well or mining the mine.

The method may comprise acquiring new geophysical and/or magnetic data during drilling or mining. This new data may be for the same magnetic parameter(s) as were used in a pre-drilling or pre-mining calculation. However, additionally or alternatively, this new data may be for different geophysical and/or magnetic parameters as were used in the pre-drilling or pre-mining calculation. For instance, the new data may additionally or alternatively comprise direct measurement of temperature from within the well or mine. There may be new data for at least one, or preferably at least two, magnetic parameters. The new geophysical and/or magnetic data may be gathered from the partly-drilled well, or partly-mined mine, such as by taking one or more well or mine logs during drilling or mining.

The method may comprise inverting said new geophysical and/or magnetic data to find corresponding new geophysical/magnetic parameter(s). This may comprise performing the inversion from geophysical (magnetic) data to geophysical (magnetic) parameter as discussed above in relation to the first aspect. Where direct temperature data has been acquired from the well or mine, this data may be used to constrain the inversion calculation.

The method may comprise inverting said new geophysical/magnetic parameter(s) to provide updated estimates of the temperature. Where there are two or more new geophysical parameters found during drilling or mining, these may be the only geophysical parameters used in the inversion. However, the new geophysical parameter(s) can also be inverted with one or more of the magnetic parameters used in the pre-drilling or pre-mining calculation. This inversion step may comprise any of the features discussed in relation to the inversion of the magnetic parameters to estimate temperature discussed in relation to the first or second aspects.

The steps of acquiring new geophysical and/or magnetic data and inverting it to find updated estimates of the temperature may be repeated throughout the drilling or mining process.

The updated estimate of the temperature may be used during the drilling or mining process in the drilling or mining decision making process, such as deciding what direction to drill or mine in and how deep to drill or mine and whether to stop drilling or mining. Thus, a more educated drilling or mining process can be carried out using the present method.

In a fourth aspect, the invention provides a method of harnessing geothermal energy. This method may comprise performing any of the methods of any of the first, second or third aspects. The method may comprise harnessing geothermal energy from the geothermal well. The harnessing of geothermal energy from the geothermal well can be performed using any known technique, such as heating a fluid circulated through the well and/or generating electricity.

In a fifth aspect, the invention provides a method of obtaining petroleum from a geological structure. This method may comprise performing any of the methods of any of the first, second or third aspects. The obtaining of petroleum from a geological structure can be performed using any known technique.

In a sixth aspect, the invention provides a method of mining for minerals (e.g. metal sulfides) from a geological structure. This method may comprise performing any of the methods of any of the first, second or third aspects. The mining for minerals from a geological structure can be performed using any known mining technique.

In a seventh aspect, the invention provides a computer program product comprising computer readable instructions that, when run on a computer, is configured to cause a processer to perform any of the above methods.

Throughout the specification, terms such as "calculating" and "estimating" may be used. These are not intended to be limiting; rather they are merely meant to mean determining or obtaining a value for an actual physical value (or at least a (close) approximation or estimate of the physical value), such as temperature.

BRIEF DESCRIPTION OF THE DRAWINGS

Preferred embodiments of the invention will now be discussed, by way of example only, with reference to the accompanying drawings, in which.

DETAILED DESCRIPTION

An embodiment of the present invention provides a method of calculating or estimating the temperature of a geological structure. The method comprises two main steps:
(i) inverting magnetic data to provide the magnetization of the geological structure; and
(ii) inverting the magnetization to estimate the temperature of the geological structure.

As discussed above, magnetic data has not previously been used to compute subsurface temperature.

Figure 1:
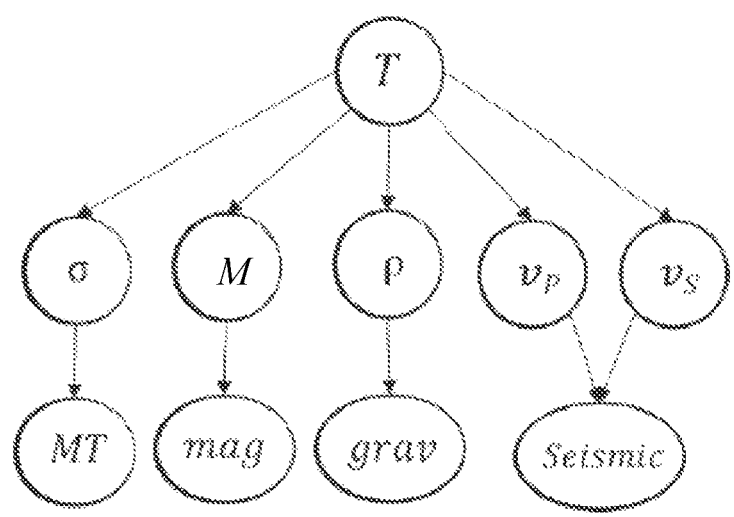
FIG. 1 is the general multi-geophysical Bayesian network for estimation of the subsurface temperature T.

Embodiments of the present invention make use of the magnetic branch of the Bayesian network shown in FIG. 1 (and discussed above), including both induced and remnant magnetization.

Figure 2:
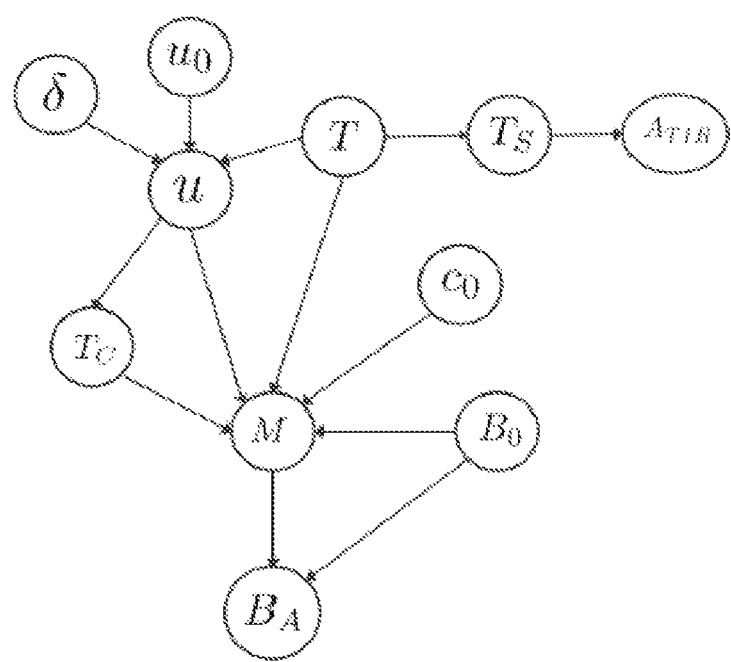
FIG. 2 is the Bayesian network for estimation of subsurface temperature T from magnetic anomaly data BA.

The magnetic branch of the Bayesian network is shown in more detail in FIG. 2. Here, $T_S$ is surface temperature, $A_{TIR}$ is the thermal infrared band from satellite data (LANDSAT-8), $u_0$ and u are initial and present-day fractions of ulvöspinel, δ is the fraction of titanomagnetite oxidized to titanomaghemite, $T_C$ is Curie temperature, $B_0$ is the earth magnetic background field (magnitude, inclination and declination), M is total magnetization (induced and remnant), $B_A$ is magnetic potential field data and $c_0$ is the overall fraction of titanomagnetite in the basaltic rock.

In principle, all of the variables in the Bayesian network of FIG. 2 can be regarded as stochastic. However, here, a simplified approach is used, taking only $B_A$, M and T as stochastic variables. The other variables are treated as deterministic hyperparameters, or as having a delta-function distributions. Thus, the main parameters of interest here are magnetic data $B_A$, rock magnetization M, and subsurface temperature T.

The Bayesian network can be applied to obtain the joint distribution for a set of parameters, incorporating the principle of conditional independence. The joint probability of a set of stochastic nodes $\{x_1, \ldots, x_n\}$ can be written as $$p(x_1, \ldots, x_n) = \prod_i p(x_i \mid x_i^{pa}), \quad (1)$$

where $x^{pa}_i$ denotes the parents of $x_i$, i.e. nodes on the level above in the network.

Using equation (1), and marginalizing hidden variables, the posterior distribution for subsurface temperature T given magnetic anomaly data BA can be written as $$p(T|B_A) = C \int dM p(T|M) p(M|B_A) p(T) \quad (2)$$

where C is the normalization factor, and M is the magnitude of the magnetization. The integral marginalizes the magnetization M.

As explained above, in practice, the inversion is performed in two separate steps:
(i) the magnetic data BA are inverted to calculate the total magnetization M; then
(ii) the total magnetization M is inverted to determine the subsurface temperature T.

At step (i), magnetization M is computed by inversion of magnetic anomaly data $B_A$. Using Bayes rule, the following is obtained $$p(M|B_A) \propto p(B_A|M) p(M), \quad (3)$$

This step is linear if magnetic properties constrained on geometry are inverted for. This is discussed below.

At step (ii), subsurface temperature T is computed by inversion of magnetization M. Again using Bayes rule, the following is obtained $$p(T|M) \propto p(M|T) p(T). \quad (4)$$

This involves a non-linear phenomenological relationship between magnetization and temperature, which is discussed below.

Finally, the posterior distribution $p(T|B_A)$ is obtained by means of equation (2). The marginalization of M can be written on a convolution form, which allows for fast and efficient computation using the fast Fourier transform (FFT).

The magnetic data $B_A$ are magnetic potential field data measured with a magnetometer.

Step (i) is performed using a map inversion method, e.g. a Marquardt-Levenberg type map inversion method, to determine laterally varying total magnetization averaged over a relevant depth interval. This is described in more detail below. Alternatively, step (i) can be performed using any other (e.g. 3D) inversion method serving the same purpose, such as the methods presented by Li and Oldenburg (1996) or Hokstad et al. (2017).

The magnetic data $B_A$ can be acquired prior to any drilling and, in that case, can be used to provide a pre-drilling estimate of the temperature by performing the method according to the invention. Additionally or alternatively, magnetic data $B_A$ can be acquired during (or after) the drilling of a well. These data can be used to provide a during-drilling or post-drilling estimate of the temperature by performing the method according to the invention, which may be considered to be an update to the existing estimates.

The map inversion method used in step (i) is now described in more detail.

Magnetic anomaly data are due to dipole sources in the subsurface. Therefore, the anomalous magnetic field B can be obtained by double differentiation of an inverse distance potential $$B(x) = -\frac{\mu_0}{4\pi} \nabla \nabla \cdot \int \frac{M(x')}{|x'-x|} dV', \quad (5)$$

where M is the magnetization vector (including induced and remnant magnetization), x' denotes the positions of magnetic sources, x is the position where the magnetic field is measured, and $\mu_0$ is the vacuum permeability.

In standard acquisition of magnetic potential field data, only the magnitude of the total magnetic field, the total magnetic intensity is obtained $$B_{TMI} = |B_0 + B| = \sqrt{|B_0|^2 + |B|^2 + 2 B_0 \cdot B}, \quad (6)$$

where $B_0$ is the earth magnetic background field.

The total magnetic anomaly $B_A$ is obtained by subtracting the local magnetic field, $$B_A = |B_0 + B| - |B_0|, \quad (7)$$

Expanding the square-root in equation (7) to second order in B, the total magnetic anomaly can be written as $$B_A \simeq |B|\cos\theta + \frac{|B|^2 \sin^2\theta}{|B_0|}, \quad (8)$$

where θ is the angle between B and $B_0$.

Introducing the unit vector $t = B_0/|B_0|$, in the direction of $B_0$, the TMA can be written as $$B_A \simeq t \cdot B + \frac{|t \times B|^2}{|B_0|}. \quad (9)$$

When $|B| << |B_0|$, the second term is insignificant, and the total magnetic anomaly is essentially the projection of the anomalous field onto the direction of the earth magnetic background field.

This assumption is used in the following.

Magnetic data capture lateral changes in magnetization very well, but have very little depth resolution. Therefore, 3D magnetic inversion is severely ill-posed, and must be heavily constrained to give meaningful results. The depth distribution of magnetic anomalies from 3D inversion is to a large degree controlled by the regularization used, and should not be over-interpreted.

In the present invention, this problem is addressed using a map-inversion method, as described in the following.

Magnetization is assumed to be independent of depth, or it represents an average over the depth range $z_1$ to $z_2$, such that $$M(x', y') = \frac{1}{z_2 - z_1} \int_{z_1}^{z_2} M(x', y', z') \quad (10)$$

Then the integral over z' in equation 5 can be carried out, giving $$\int_{z_1}^{z_2} \frac{1}{r} dz' = \ln[(z'-z)+r]\Big|_{z_1}^{z_2} = F(z_2) - F(z_1). \quad (11)$$

Where, for later convenience, we have introduced the distance $$r = \sqrt{(x'-x)^2 + (y'-y)^2 + (z'-z)^2}, \quad (12)$$

and the function $$F(z') = \ln[(z'-z)+r]. \quad (13)$$

Substituting in equation 5, and using equation 9, the total magnetic anomaly can be written as $$B_A(x) \simeq t \cdot B(x) = \frac{\mu_0}{4\pi} \sum_{i=1}^{3} \sum_{j=1}^{3} \int t_i A_{ij}(x, x') M_j(x', y') dx' dy', \quad (14)$$

where $t_i$ and $M_j$ are elements of the vectors t and M, respectively, and $A_{ij}$ are the elements of a second-order tensor given by $$A_{ij} = \frac{\partial^2 F(z_2)}{\partial x_i \partial x_j} - \frac{\partial^2 F(z_1)}{\partial x_i \partial x_j}, \quad (15)$$

where the derivatives are with respect to horizontal coordinates $(x_1, x_2) = (x, y)$, and $$\frac{\partial^2 F(z')}{\partial x_i \partial x_j} = -\frac{1}{|(z'-z)+r|^2}\left[\delta_{i3} + \frac{(x'_i - x_i)}{r}\right]\left[\delta_{j3} + \frac{(x'_j - x_j)}{r}\right] \quad (16)$$
$$+ \frac{1}{|(z'-z)+r|}\left[\frac{\delta_{ij}}{r} - \frac{(x'_i - x_i)(x'_j - x_j)}{r^3}\right],$$

and $\delta_{ij}$ is the Kronecker delta function.

From the forward model equation 14, it is clear that three-component magnetization M cannot be readily obtained by inversion of scalar data $B_A$. However, if an estimate of the direction of magnetization is known, it may be attempted to invert for the magnitude, which is a feasible problem.

Hence, it can be written that $$M = Me, \quad (17)$$

where M(x', y') and e are the magnitude and a unit vector in the direction of the magnetization, respectively. In many cases the magnetization is approximately parallel to the paleomagnetic field at the time when the rock solidified. For very young igneous rocks it is reasonable to assume e=t. When the magnetization M is parallel to the inducing field $B_0$, it is difficult to distinguish remnant magnetization $M_R$ from induced magnetization $M_I = \chi H_0$, where $H_0 = B_0/\mu_0$. Without additional information, the two parts are often mixed together in an apparent susceptibility $$\chi_{eff} = M/H_0 = \chi + M_R/H_0. \quad (18)$$

In general, a tectonic reconstruction and kinematic restoration may be needed to estimate e.

Assuming a geomagnetic problem with $n_d$ measurements and $n_m$ model parameters, the forward problem can be written on matrix-vector form as $$d = Lm + n, \quad (19)$$

where d is a $n_d \times 1$ data vector with component $d_i = B_A(x_i, y_i)$ is a $n_m \times 1$ model vector with components $m_j = M(x_j, y_j)$, n is noise, and L is a $n_d \times n_m$ matrix. Assuming that e=t, the elements of the matrix L become $$L_{ij} = \frac{\mu_0}{4\pi} \sum_{k=1}^{3} \sum_{l=1}^{3} t_k A_{kl}(x_i, x_j) t_l. \quad (20)$$

In a statistical formulation of the inverse problem, using Bayes rule, the posterior distribution p(m|d)| can be written as $$p(m|d) = Cp(d|m)p(m) = Ce^{-\Phi}, \quad (21)$$

where C is a normalization factor, and $\Phi$ is the objective function for an optimization-type inversion, $$\Phi = \tfrac{1}{2}|d-Lm|^T \Sigma_d^{-1}|d-Lm| + \tfrac{1}{2}[m]^T \Sigma_m^{-1} m^T m. \quad (22)$$

It is assumed that the prior distribution for m is Gaussian with zero mean, which is reasonable for inversion of anomaly data. Since the forward model equation 19 is linear in m, the likelihood and posterior distributions are Gaussian. Then maximizing the posterior probability is equivalent to minimizing the objective function $\Phi$. This can be achieved with the least squares-pseudo inverse, $$\mu_{m|d} \triangleq m = |L^T \Sigma_d^{-1} L + \Sigma_m^{-1}|^{-1} L^T \Sigma_d^{-1} d, \quad (23)$$

where $\mu_{m|d}$ denotes the posterior mean of the magnetization M. For simplicity, $\Sigma_d$ is chosen to be proportional to the identity matrix. If $\Sigma_m^{-1}$ is chosen as $$\Sigma_m^{-1} = \lambda \text{diag}(L^T L), \quad (24)$$

the classical Marquardt-Levenberg solution is obtained. If $\Sigma_m^{-1}$ is chosen as $$\Sigma_m^{-1} = \lambda D^T D, \quad (25)$$

where D is the first-derivative matrix, a smoother solution is obtained. Here, $\lambda$ is a parameter controlling the relative weights put on the data term and regularization term of the objective function.

The posterior covariance matrix is independent of the data, and can be written explicitly as $$\Sigma_{m|d} = \Sigma_m - \Sigma_m L^T [L \Sigma_m L^T + \Sigma_d]^{-1} L \Sigma_m. \quad (26)$$

The posterior variances are the diagonal elements of $\Sigma_{m|d}$. The second term on the right hand side is positive definite. Hence, the effect of adding information from data is to reduce the uncertainty.

Step (ii) uses a Bayesian inversion method involving a phenomenological model relating the magnetization to the temperature, to calculate the temperature value from the magnetization. The phenomenological model is based on spinodal exsolution of titanomagnetite and the 1D Ising model from quantum statistics. This is described in more detail below. As a by-product of this step, estimates of the Curie temperatures and fractions of different titanomagnetite phases are also obtained.

In order to obtain a spatially dependent 3D temperature function, the temperature of the geological structure is calculated point-wise for multiple different points/locations/volumes/spaces in the geological structure. As can be appreciated, the magnetic parameter(s) may vary over the space of the geological structure, and this may correspond to a spatially varying temperature.

The phenomenological model relating magnetization to underlying rock properties is now described.

The magnetic properties of rocks are mainly determined by a small number of strongly magnetic minerals. Most important are titanomagnetite, which may subsequently oxidize to titanomaghemite. Still, titanomagnetite only makes up a relatively small fraction of the total rock volume, typically 1-10%. The remnant and induced magnetization depend strongly on temperature, in addition to chemical processes and hydrothermal alteration. Magnetization is strongly temperature dependent, and can be pictured as a battle between quantum-mechanical order and thermal disorder. When magma cools and solidifies, single-domain titanomagnetite forms as a solid solution of magnetite and ulvöspinel. Upon further cooling, this solid solution may enter the miscibility gap, where it becomes unstable, and decomposes into new phases with different composition.

To describe the thermal effects on magnetization, a simple model is needed that statistically links quantum effects to the macroscopic magnetization. Here, a simplified version of the Ising (1925) model from quantum statistics is used. In the Ising model, the Hamiltonian $\mathcal{H}$ (energy) for a system of particles with interacting spins $\sigma_j$, and under the influence of an external magnetic field H is given by $$\mathcal{H} = -J \sum_{\langle ij \rangle} \sigma_i \sigma_j - \mu_H H \sum_j \sigma_j, \quad (27)$$

where $\mu_B$ is the magnetic moment of each particle, J is the inter-particle interaction strength, and the notation $\langle ij \rangle$ means that the sum runs over all nearest-neighbors combinations i; j. In equation 27, the first term represents remnant magnetization, and the second term induced magnetization.

After some algebra, using methods of statistical mechanics and the Boltzmann distribution, the macroscopic magnetization of an ensemble of particles can be written as $$\frac{M}{M_0} = \tanh\left[\frac{T_C M}{T M_0} + \frac{CH}{T M_0}\right]. \quad (28)$$

Here M is the magnitude of the magnetization, $M_0$ is the magnetization at absolute zero, T is the temperature (in Kelvin) $T_C$ is the Curie temperature, and C is the Curie constant. The derivation of equation 28 is outlined below. Equation 28 is a transcendental equation which can be solved graphically or numerically. The susceptibility $\chi$ is given by $$\chi = \frac{M(T, H) - M(T, 0)}{H}, \quad (29)$$

where $\chi$ is the magnetic susceptibility, and $M(T, 0) = M_R$ is the remnant magnetization. For large temperatures, equation 28 can be linearized, which leads to the Curie-Weiss law, $$\chi = \frac{M}{H} = \frac{C}{T - T_C}. \quad (30)$$

The Ising model can be used to represent the magnetic properties of a homogeneous single-domain magnetic phase. For a heterogeneous mix of magnetic phases, a linear combination of single-phase models is used, $$M(T, H) = \sum_j w_j M_j(T, H), \quad (31)$$

where $w_j$ is the weight of magnetic phase j. The linear superposition is supported by the linearity in M of the equations 5 and 15.

With equation 28, only positive magnetization can be modelled. Negative remnant magnetization is, however, frequently observed in magnetic data, also for young MORB. Negative magnetization can be modelled by means of self-reversal for one or more of the magnetic phases. In practice this is achieved by means of negative weight $w_i$, and reversing the sign of H in equation 28.

The model given in equation 31 can represent a large variety of temperature dependence of magnetization, by superposition of two or three mechanisms with different Curie temperatures, similar to those shown in experimental studies.

When an igneous rock forms by cooling of magma, titanomagnetite forms as a solid solution of ulvöspinel and magnetite. Also, a part of the titanomagnetite may be transformed by high temperature oxidation to titanomaghemite.

The spinodal decomposition takes place for a simple two-component solution. A homogeneous solid solution is formed at temperature $T_0$ with initial fractions $u_0$ and $v_0$ of the two components. Upon subsequent cooling, to temperature T the solid solution enters the miscibility gap, where it becomes unstable, and decompose into new phases with compositions $u_1$, $v_1$ and $u_2$, $v_2$. The phases may continue to decompose by bi-nodal decomposition to phases with compositions $u_3$, $v_3$ and $u_4$, $v_4$. However, this relies on the process of nucleation, and is a much slower process. From mass conservation, u and v are not independent, and the system can be described by one of them. In the following, u is used.

The spinodal decomposition is controlled by the Gibbs free energy. For the simplest model, the Gibbs free energy and spinodal are symmetric around $u=\frac{1}{2}$. Laboratory studies on spinodal decomposition of titanomagnetites show that the spinodal does not have this symmetry. Gibbs free energy for a two-component solution consists of an enthalpy term and an entropy term. In an external magnetic field, the entropy of the magnetite will be lower than the entropy of ulvöspinel, because magnetite is magnetic, whereas ulvöspinel is not. This asymmetry can be captured if the Gibbs free energy G of the system is expressed as $$G(u,v,T)=W(uv+u\delta+v\delta)+k_BT[(1+h)u\ln u+(1-h)v\ln v+\delta \ln \delta]|, \quad (32)$$

where u is the fraction of magnetite, v is the fraction of ulvöspinel, and $\delta$ is the fraction of titanomaghemite. $\delta$ is assumed to be small, and constant during the spinodal decomposition. By mass conservation the conditions $u+v+\delta=1$ and $\theta u/\theta G=-1$ are obtained. Moreover, W is the mixing enthalpy parameter, $k_B$ is the Boltzmann constant, and the parameter h accounts for the different magnetic entropies of magnetite and ulvöspinel in the presence of an external magnetic field.

The first and second derivatives of the Gibbs free energy are obtained as $$\frac{\partial G}{\partial u} = -W(u-v) + k_BT[(1+h)\ln u - (1-h)\ln v + 2h], \quad (33)$$

and $$\frac{\partial^2 G}{\partial u^2} = -2W + k_BT\left[\frac{(1+h)}{u} + \frac{(1-h)}{v}\right] \quad (34)$$

The spinodal decomposition takes place when $$\frac{\partial^2 G}{\partial u^2} < 0,$$

and terminates at the spinode defined by $$\frac{\partial^2 G}{\partial u^2} = 0.$$

Equation 34 is a square equation for u, which gives two solutions $u_1$ and $u_2$, for two different solid solutions with different magnetite and ulvöspinel fractions. Setting h=0 and $\delta=0$, we obtain spinodal symmetric around $u=\frac{1}{2}$. The parameters W and h were adjusted to fit the spinodal model to experimental measurements. Given temperature, the model then predicts the equilibrium fractions of ulvöspinel and magnetite for the phases with composition $u_1$ and $u_2$, respectively. Moreover, from the empirical model presented by Lattard et al. (2006), $$T_C(u)=-150u^2-580u+851, \quad (35)$$

the corresponding Curie temperatures of the two phases are also obtained.

The main constituents of MORB are olivine, pyroxene and plagiochlase. Though titanomagnetite and sometimes titanomaghemite are the main minerals responsible for the magnetization of the basalt, these minerals will normally make up only a small percentage of the total rock volume, typically 2-10%.

By stoichiometric balancing, the weight functions for the Ising model equation 31 are obtained as $$w_1 = c_0(1-\delta)\frac{u_0-u_2}{u_1-u_2} \quad (36)$$

$$w_2 = c_0(1-\delta)\frac{u_1-u_0}{u_1-u_2} \quad (37)$$

$$w_3 = c_0\delta \quad (38)$$

where $c_0$ is the overall volume fraction of magnetic minerals (titanomagnetite and titanomaghemite) in the rock.

Due to the low depth resolution of magnetic potential field data, a simplified representation in terms of depth-average magnetization was chosen, as given in equation 10. Consequently, a simplified parameterization for subsurface temperature vs depth was also sought. The subsurface temperature T is represented as $$T(z,\beta)=T_\infty+(T_S-T_\infty)e^{-\beta z} \quad (39)$$

where $T_S$ is the land surface temperature, and $T_\infty$ is the asymptotic value for $z\to\infty$. With the decay parameter $\beta$ varying from 0.1 to 0.5 $km^{-1}$, anything from conductive thermal gradients of order 40° C./km to geothermal anomalies close to the boiling curve can be represented.

The land surface temperature $T_S$ may vary significantly in active geothermal areas, e.g. near hot springs and fumaroles. A simple option is to express $T_S$ as a function of $\beta$ $$T_S(\beta)=\alpha\beta^n+b \quad (40)$$

where n=4 or n=6 give reasonable results.

The land surface temperature Ts can also be constrained on observed data. The land surface temperature can be estimated using remote-sensing satellite data. Here, a method utilizing LANDSAT-8 bands 4,5 and 8, i.e. the red, near infrared (NIR) and thermal infrared (TIRS) bands is applied. The method of Avdan and Jovanovska (2016) has been adapted to a statistical inversion framework, similar to that presented for magnetization above. However, the resolution of the TIRS bands (90 m) is not able to capture the high temperatures near hot springs.

The decay parameter $\beta$ can be associated with an average temperature $\hat{T}(\beta)$ defined by $$\hat{T}(\beta) = \frac{1}{z_2 - z_1} \int_{z_1}^{z_2} T(z, \beta) dz \qquad (41)$$

Given average magnetization from inversion of magnetic anomaly data, the average magnetization can be inverted for average subsurface temperature of the magnetic source layer. Using equations 39 and 41, the link between average temperature and temperature vs depth is established at the forward modelling stage of the Bayesian inversion, i.e. as part of computing the likelihood part of the posterior probability distribution.

The above method can be used when prospecting for geothermal energy, petroleum, and/or minerals (e.g. metal sufides), e.g. when planning and performing geothermal/petroleum well drilling or mineral mining operations.

In one embodiment, the calculated temperature is used prior to drilling or mining, when deciding where to drill the well and/or how deep to drill the well, or where/how deep to mine the mine.

In the same or other embodiments, the calculated temperature is used during or after the drilling of the well or mining of the mine, when deciding in which direction or to which depth to continue drilling or mining.

The temperature estimate can be updated during drilling/mining based on new measure data.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

REFERENCES

Advan, U., and G. Jovanovska, 2016, Algorithm for automated mapping pf land surface temperature using LANDSAT 8 satellite data; Journal of Sensors, 2016, 1-8.

Hokstad, K., and K. Tänaysuu-Mileviciene, 2017, Temperature prediction by multigeophysical inversion: Application to the IDDP-2 well at Reykjanes, Iceland: GRC Transactions, 42, 1141-1152.

Lattard, D., R. Engelmann, A. Kontny, and U. Sauerzapf, 2006, Curie temperatures of synthetic titanomagnetites in the Fe—Ti—O system: Effects of composition, crystal chemistry, and thermomagnetic methods: J. Geophys. Res., 111.

Li, Y., and D. Oldenburg, 1996, 3-D inversion of magnetic data: Geophysics, 61, 394-408.

We claim:

1. A method of prospecting for geothermal energy, petroleum, and/or minerals comprising calculating a temperature of a geological structure and using the temperature in a decision-making process for drilling a well or for mining a mine; wherein there is provided at least one magnetic parameter of the geological structure, the method comprising:
    inverting only the at least one magnetic parameter to estimate the temperature of the geological structure;
    wherein the at least one magnetic parameter comprises a total magnetization of the geological structure.

2. The method as claimed in claim 1, herein the total magnetization of the geological structure comprises both an induced magnetization and a remnant magnetization of the geological structure.

3. The method as claimed in claim 1, further comprising providing magnetic data and inverting the magnetic data to provide the at least one magnetic parameter.

4. The method as claimed in claim 3, wherein the magnetic data comprises magnetic potential field data.

5. The method as claimed in claim 3, wherein inverting the magnetic data to provide the at least one magnetic parameter is performed using a map inversion method.

6. The method as claimed in claim 3, wherein inverting the magnetic data to provide the at least one magnetic parameter provides laterally varying magnetization averaged over a depth interval.

7. The method as claimed in claim 3, wherein the magnetic data is acquired with a magnetometer.

8. The method as claimed in claim 1, wherein inverting the at least one magnetic parameter to estimate the temperature of the geological structure is performed using a Bayesian inversion method and a phenomenological model.

9. The method as claimed in claim 8, wherein the phenomenological model provides a relationship between the at least one magnetic parameter and the temperature of the geological structure.

10. The method as claimed in claim 8, wherein the phenomenological model uses or is based on:
    (i) a spinodal exsolution model and/or an Ising model from quantum statistics; or
    (ii) a bi-nodal exsolution model and/or JMAK kinetics.

11. The method as claimed in claim 8, wherein the phenomenological model comprises one or more parameters and the method comprises calibrating the one or more parameters.

12. The method as claimed in claim 11, wherein the one or more parameters comprise an initial titanium fraction of lavas at a time of deposition and/or a total percentage of magnetic material in a subsurface.

13. The method as claimed in claim 1, further comprising providing estimates of Curie temperatures, mineral composition, and/or fractions of different titanomagnetite phases.

14. The method as claimed in claim 1, further comprising selecting a phenomenological model that defines a relationship between the at least one magnetic parameter and the temperature of the geological structure.

15. The method as claimed in claim 1, further comprising finding an uncertainty in the calculated temperature.

16. The method as claimed in claim 1, wherein the temperature is calculated for a specific point/location/volume/space of the geological structure, the specific point/location/volume/space corresponding to a point/location/volume/space of the at least one magnetic parameter.

17. A method of producing a temperature model of the geological structure comprising performing the method of claim 1.

18. A method of harnessing the geothermal energy comprising performing the method of claim 1.

19. A method of obtaining the petroleum from the geological structure comprising performing the method of claim 1.

20. A method of mining for the minerals from the geological structure comprising performing the method of claim 1.

21. A computer program product comprising computer readable instructions that, when run on a computer, is configured to cause a processer to perform the method of claim 1.

* * * * *